United States Patent
Uematsu et al.

(10) Patent No.: US 12,242,111 B2
(45) Date of Patent: Mar. 4, 2025

(54) OPTICAL MULTIPLEXING/DEMULTIPLEXING METHOD, OPTICAL MULTIPLEXING/DEMULTIPLEXING CIRCUIT, AND MANUFACTURING METHOD THEREOF

(71) Applicant: NIPPON TELEGRAPH AND TELEPHONE CORPORATION, Tokyo (JP)

(72) Inventors: Takui Uematsu, Musashino (JP); Hidenobu Hirota, Musashino (JP); Hiroyuki Iida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 198 days.

(21) Appl. No.: 17/794,710

(22) PCT Filed: Feb. 21, 2020

(86) PCT No.: PCT/JP2020/007249
§ 371 (c)(1),
(2) Date: Jul. 22, 2022

(87) PCT Pub. No.: WO2021/166262
PCT Pub. Date: Aug. 26, 2021

(65) Prior Publication Data
US 2023/0100044 A1    Mar. 30, 2023

(51) Int. Cl.
*G02B 6/28*        (2006.01)
*H04B 10/61*       (2013.01)

(52) U.S. Cl.
CPC .............. *G02B 6/28* (2013.01); *H04B 10/614* (2013.01)

(58) Field of Classification Search
CPC .................................................. G02B 6/2821
See application file for complete search history.

(56) References Cited

U.S. PATENT DOCUMENTS 4,723,827 A * 2/1988 Shaw ................... G02B 6/2826
 385/16
4,798,436 A * 1/1989 Mortimore ........... G02B 6/2552
 359/900

(Continued)

FOREIGN PATENT DOCUMENTS

JP   H08-304662 A   11/1996
JP   2003-519822 A  6/2003

OTHER PUBLICATIONS

Uematsu et al., "Study on optical fiber coupler using side-polishing method", IEICE Tech. Rep., vol. 119, No. 223, OFT2019-36, pp. 23-26, Oct. 2019.

*Primary Examiner* — John Bedtelyon

(57) ABSTRACT

An optical multiplexing and demultiplexing method of the present disclosure includes arranging, face to face, a polished surface of a coated optical fiber whose side surface is polished to a core or a vicinity of the core and a polished surface of an optical waveguide whose propagation constant varies in a longitudinal direction and whose side surface is polished to a core or a vicinity of the core, and aligning the polished surface of the coated optical fiber and the polished surface of the optical waveguide so that desired branching ratio is obtained from one end of the coated optical fiber to the end, distal to the former end, of the optical waveguide by relatively moving the polished surface of the coated optical fiber and the polished surface of the optical waveguide.

3 Claims, 9 Drawing Sheets

(56) References Cited

U.S. PATENT DOCUMENTS

| | | | |
|---|---|---|---|
| 4,997,248 A | | 3/1991 | Stowe |
| 5,029,961 A | * | 7/1991 | Suzuki .................. G02B 6/283 385/50 |
| 5,940,556 A | | 8/1999 | Moslehi et al. |
| 2002/0136498 A1 | | 9/2002 | Aldridge et al. |

* cited by examiner

[2]

[3]

[5]

[6]

[8]

[9]

OPTICAL MULTIPLEXING/DEMULTIPLEXING METHOD, OPTICAL MULTIPLEXING/DEMULTIPLEXING CIRCUIT, AND MANUFACTURING METHOD THEREOF

CROSS-REFERENCE TO RELATED APPLICATIONS

This application is a 371 U.S. National Phase of International Application No. PCT/JP2020/007249, filed on Feb. 21, 2020. The entire disclosure of the above application is incorporated herein by reference.

TECHNICAL FIELD

The present disclosure relates to optical multiplexing and demultiplexing methods, optical multiplexing and demultiplexing circuits, and manufacturing methods for optical multiplexing and demultiplexing circuits.

BACKGROUND ART

There is a need for an optical multiplexing and demultiplexing circuit that is able to demultiplex light from a coated optical fiber currently in use and to multiplex the light to the coated optical fiber currently in use without cutting the coated optical fiber currently in use.

Meanwhile, a manufacturing method for an optical fiber coupler using a side-polishing method has been studied as one of optical multiplexing and demultiplexing techniques for inputting and outputting light signals to and from a coated optical fiber without cutting the coated optical fiber (see Non Patent Literature (NPL) 1, for example). In this manufacturing method for the optical fiber coupler, a coated optical fiber currently in use (currently used coated fiber) is bent, then a coated optical fiber for branching (optical waveguide for branching) is set to face the bent portion from the side surface, and light is demultiplexed from the currently used coated fiber to the optical waveguide for branching or light is multiplexed from the optical waveguide for branching to the currently used coated fiber.

The procedure of the manufacturing method for the optical fiber coupler is as follows.
(1) With respect to a block including a groove into which a currently used coated fiber is to be fitted while forming an arc shape, a currently used coated fiber is accommodated and fixed in the groove, and then a side surface of the currently used coated fiber is polished in such a manner that a coating and a cladding portion thereof are polished to reach a position separated several μm from the core or polished to reach the core.
(2) The side surface of an optical waveguide for branching buried in a block is polished beforehand in such a manner that a coating and a cladding portion thereof are polished to reach a position separated several μm from the core or polished to reach the core.
(3) The polished surface of the currently used coated fiber whose side surface is polished and the polished surface of the optical waveguide for branching whose side surface is polished beforehand are arranged face to face, and the polished surfaces are fixed at positions so that desired branching ratio is obtained by moving the blocks relative to each other in a polished surface direction.

CITATION LIST

Non Patent Literature

NPL 1: Uematsu et al., "Study on optical fiber coupler using side-polishing method", IEICE Tech. Rep., vol. 119, no. 223, OFT2019-36, pp. 23-26, Oct. 2019

SUMMARY OF THE INVENTION

Technical Problem

A currently used coated fiber is defined by specifications, standards, and the like of optical fibers. However, even within the definition, there are variations in propagation constants of optical fibers. Moreover, it is difficult to grasp the propagation constant of the optical fiber of the currently used coated fiber at an in-service time without cutting the currently used coated fiber.

Because an optical multiplexing and demultiplexing circuit adopted in the related art uses evanescent coupling generated when cores approach each other, coated optical fibers having the same standards or coated optical fibers having propagation constants equivalent to each other are normally applied to the currently used coated fiber and the optical waveguide for branching. In a case where the propagation constant differs between the currently used coated fiber and the optical waveguide for branching, because the evanescent coupling becomes weaker in strength as the difference in propagation constant increases, multiplex characteristics, demultiplex characteristics, and the like of the optical multiplexing and demultiplexing circuit are deteriorated.

Means for Solving the Problem

The present disclosure solves the issues described above, and an object thereof is to provide an optical multiplexing and demultiplexing method, an optical multiplexing and demultiplexing circuit, and a manufacturing method for an optical multiplexing and demultiplexing circuit, which are applicable to currently used coated optical fibers having a diversity of propagation constants while minimizing influence on the currently used coated optical fibers.

In order to achieve the object described above, in the present disclosure, a polished surface of a coated optical fiber whose side surface is polished to a core or a vicinity of the core and a polished surface of an optical waveguide whose propagation constant varies in a longitudinal direction and whose side surface is polished to a core or a vicinity of the core are arranged face to face.

Specifically, an optical multiplexing and demultiplexing method of the present disclosure includes arranging, face to face, a polished surface of a coated optical fiber whose side surface is polished to a core or a vicinity of the core and a polished surface of an optical waveguide whose propagation constant varies in a longitudinal direction and whose side surface is polished to a core or a vicinity of the core; and aligning the polished surface of the coated optical fiber and the polished surface of the optical waveguide so that desired branching ratio is obtained from one end of the coated optical fiber to the end, distal to the former end, of the optical waveguide by relatively moving the polished surface of the coated optical fiber and the polished surface of the optical waveguide.

Specifically, an optical multiplexing and demultiplexing circuit of the present disclosure is configured such that a polished surface of a coated optical fiber whose side surface is polished to a core or a vicinity of the core and a polished surface of an optical waveguide whose propagation constant varies in a longitudinal direction and whose side surface is polished to a core or a vicinity of the core are joined.

Specifically, a manufacturing method for an optical multiplexing and demultiplexing circuit of the present disclosure includes: arranging, face to face, a polished surface of a coated optical fiber whose side surface is polished to a core or a vicinity of the core, and a polished surface of an optical waveguide whose propagation constant varies in a longitudinal direction and whose side surface is polished to a core or a vicinity of the core; and fixing the polished surface of the coated optical fiber and the polished surface of the optical waveguide so that desired branching ratio is obtained from one end of the coated optical fiber to the end, distal to the former end, of the optical waveguide by relatively moving the polished surface of the coated optical fiber and the polished surface of the optical waveguide.

Effects of the Invention

According to the optical multiplexing and demultiplexing method, the optical multiplexing and demultiplexing circuit, or the manufacturing method for the optical multiplexing and demultiplexing circuit, it is an object to provide an optical multiplexing and demultiplexing method and an optical multiplexing and demultiplexing circuit, which are applicable to currently used coated optical fibers having a diversity of propagation constants while minimizing influence on the currently used coated optical fibers.

DESCRIPTION OF EMBODIMENTS

Hereinafter, embodiments of the present disclosure will be described in detail with reference to the drawings. Note that the present disclosure is not limited to the embodiments described below. These embodiments are just illustrative examples, and the present disclosure can be implemented in forms in which various modifications and improvements are added on the basis of knowledge of those skilled in the art. Note that constituent elements with the same reference signs in the specification and the drawings are assumed to be the same constituent elements.

Figure 1:
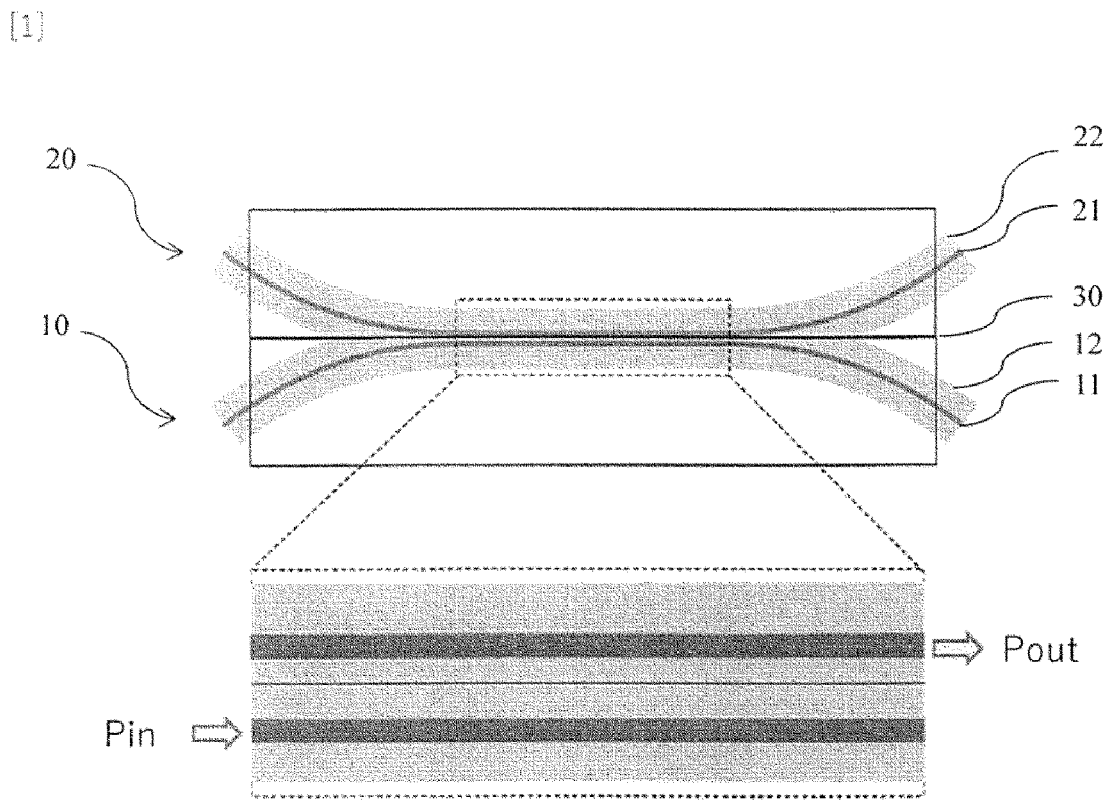
FIG. 1 illustrates a configuration of an optical multiplexing and demultiplexing circuit.

The configuration of an optical multiplexing and demultiplexing circuit of the present disclosure will be described with reference to FIG. 1. In FIG. 1, reference sign 10 denotes a currently used coated optical fiber, reference sign 11 denotes a core of the currently used coated optical fiber, reference sign 12 denotes a cladding region of the currently used coated optical fiber, reference sign 20 denotes an optical waveguide for branching, reference sign 21 denotes a core of the optical waveguide for branching, reference sign 22 denotes a cladding region of the optical waveguide for branching, and reference sign 30 denotes a polished surface. The optical waveguide for branching 20 may be a coated optical fiber or a planar optical waveguide. The propagation constant of the optical waveguide for branching 20 varies in a longitudinal direction in a coupling section with the currently used coated optical fiber 10. A side surface of the currently used coated optical fiber 10 and a side surface of the optical waveguide for branching 20 are polished the respective cores or vicinities of the cores, and the polished surfaces are joined to each other. For the joining, the surfaces may be fixed with an adhesive that also serves as a refractive index matching material, or a refractive index matching material may be applied to mechanically fix the surfaces with a clip. The same applies to the disclosure described below. Desired branching ratio is obtained from one end of the currently used coated optical fiber 10 (Pin direction in FIG. 1) to the end, distal to the former end, of the optical waveguide for branching 20 (Pout direction in FIG. 1).

An optical multiplexing and demultiplexing method and a manufacturing method for the optical multiplexing and demultiplexing circuit will be described with reference to FIG. 1. In FIG. 1, the polished surface of the coated optical fiber 10 whose side surface is polished to the core 11 or the vicinity of the core 11 and the polished surface of the optical waveguide for branching 20 whose propagation constant varies in the longitudinal direction and whose side surface is polished to the core 21 or the vicinity of the core 21 are arranged face to face. Then, the polished surface of the currently used coated optical fiber 10 and the polished surface of the optical waveguide for branching 20 are moved relative to each other to align the polished surfaces so that the desired branching ratio is obtained from the end of the currently used coated optical fiber 10 to the distal end of the optical waveguide for branching 20. To manufacture the optical multiplexing and demultiplexing circuit, the polished surfaces each other are further fixed after the alignment. For the fixing, the surfaces may be fixed with an adhesive that also serves as a refractive index matching material, or a refractive index matching material may be applied to mechanically fix the surfaces with a clip. The optical waveguide for branching 20 may be a coated optical fiber or a planar optical waveguide. The same applies to the disclosure described below.

Figure 2:
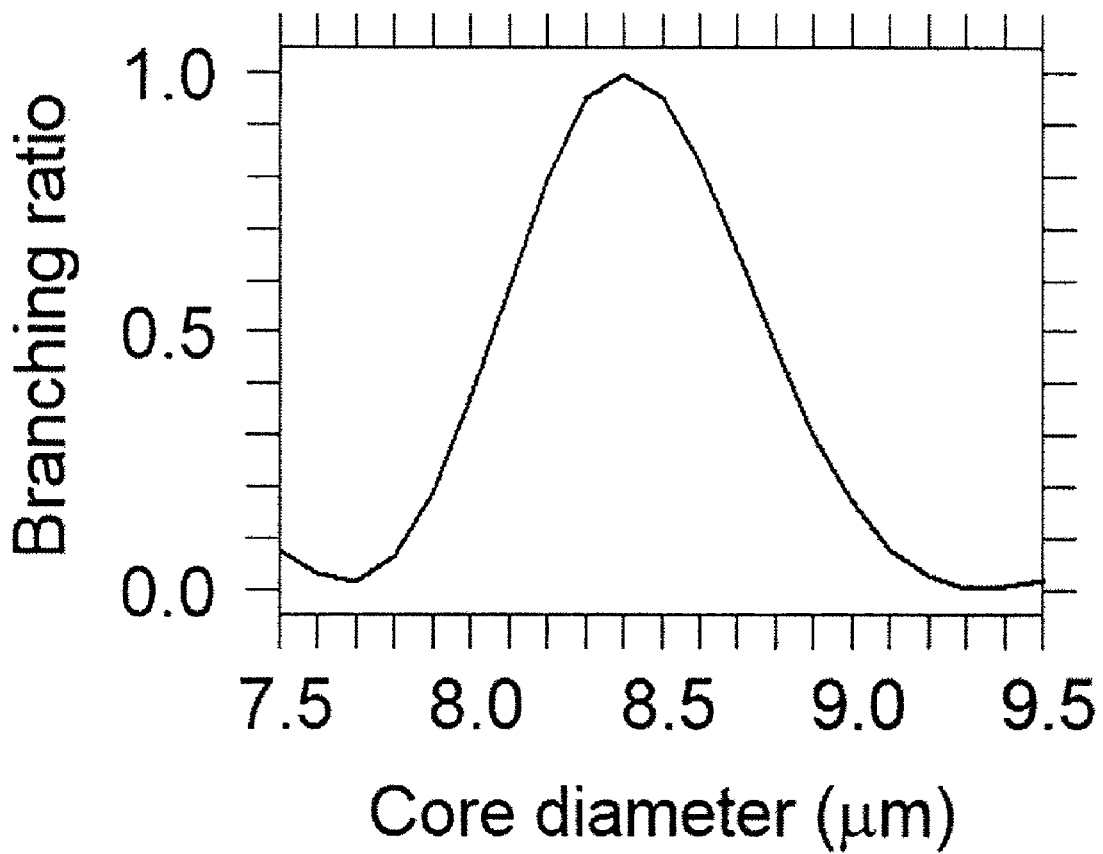
FIG. 2 depicts characteristics of an optical multiplexing and demultiplexing circuit.
Figure 3:
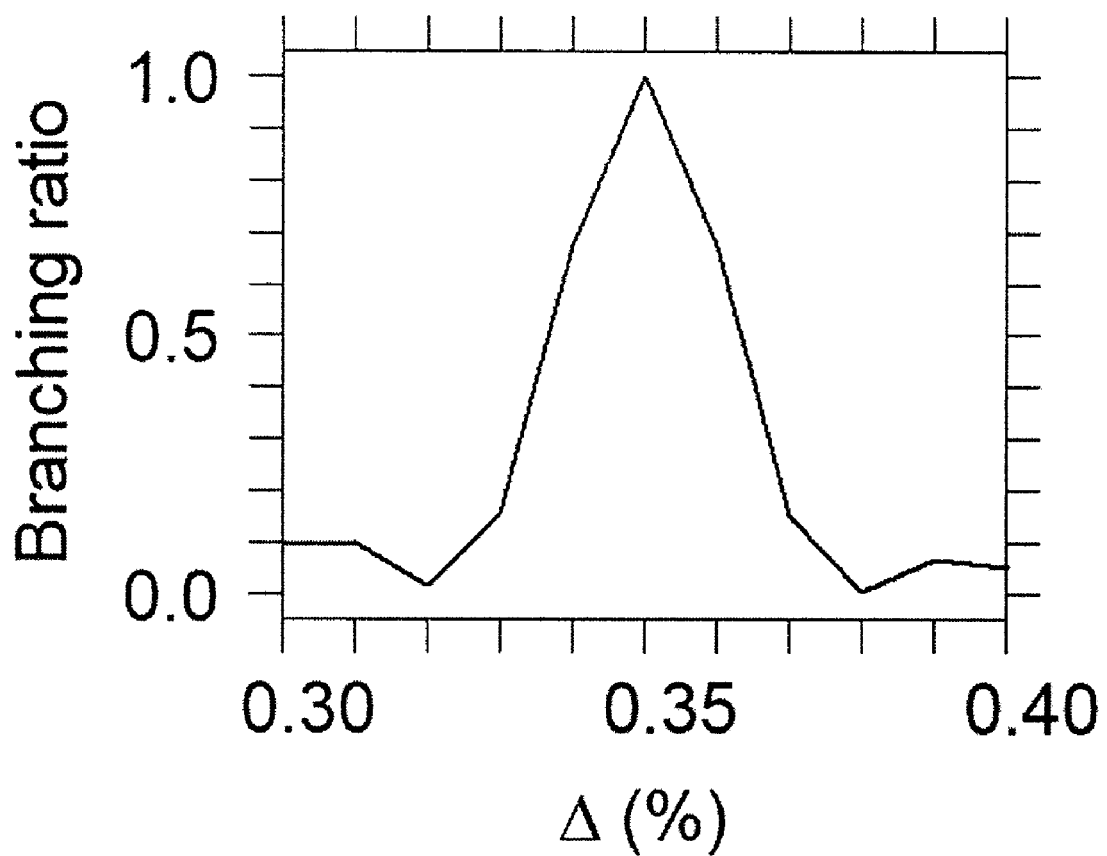
FIG. 3 depicts characteristics of an optical multiplexing and demultiplexing circuit.

Branching characteristics of the optical multiplexing and demultiplexing circuit depend on a difference between the propagation constant of the currently used coated optical fiber 10 and the propagation constant of the optical waveguide for branching 20. FIG. 2 depicts branching ratio to variation in core diameter of the currently used coated optical fiber 10 under a condition where core diameter of the optical waveguide for branching 20 is set to 8.4 μm and refractive index contrast between the core and the cladding region thereof is set to 0.35%, and FIG. 3 depicts branching ratio to variation in refractive index contrast Δ between the core and the cladding region of the currently used coated optical fiber 10 under the same condition. The refractive index contrast is expressed as $(n_{core}^2 - n_{clad}^2)/(2 \times n_{core}^2)$ where refractive indices of the core and the cladding region are $n_{core}$ and $n_{clad}$, respectively. Hereinafter, variability in the propagation constant of the currently used coated optical fiber 10 is exemplified as variability in the core diameter or the refractive index contrast Δ between the core and the cladding region. The branching ratio refers to ratio of Pout/Pin in FIG. 1. In FIG. 2, when the core diameter of the currently used coated optical fiber 10 equals the core diameter of the optical waveguide for branching 20, the value of the branching ratio is 1. However, when the core diameter of the currently used coated optical fiber 10 is set to 9.0 µm, the value of the branching ratio is 0.15. Similarly in FIG. 3, when the refractive index contrast Δ of the currently used coated optical fiber 10 equals the refractive index contrast of the optical waveguide for branching 20, the value of the branching ratio is 1, and otherwise, the branching ratio decreases.

In the present disclosure, the propagation constant of the optical waveguide for branching 20 varies in the longitudinal direction in a coupling section with the currently used coated optical fiber 10. The propagation constant varying in the longitudinal direction results in a constant value of the branching ratio in FIGS. 2 and 3.

According to the optical multiplexing and demultiplexing method, the optical multiplexing and demultiplexing circuit, and the manufacturing method for the optical multiplexing and demultiplexing circuit of the present disclosure, the use of the optical waveguide for branching whose propagation constant varies in the longitudinal direction makes it possible to multiplex and demultiplex the light with one type of optical waveguide for branching or a small number of types of optical waveguides for branching for the currently used coated optical fibers having a diversity of propagation constants while minimizing influence on the currently used coated optical fibers.

Figure 4:
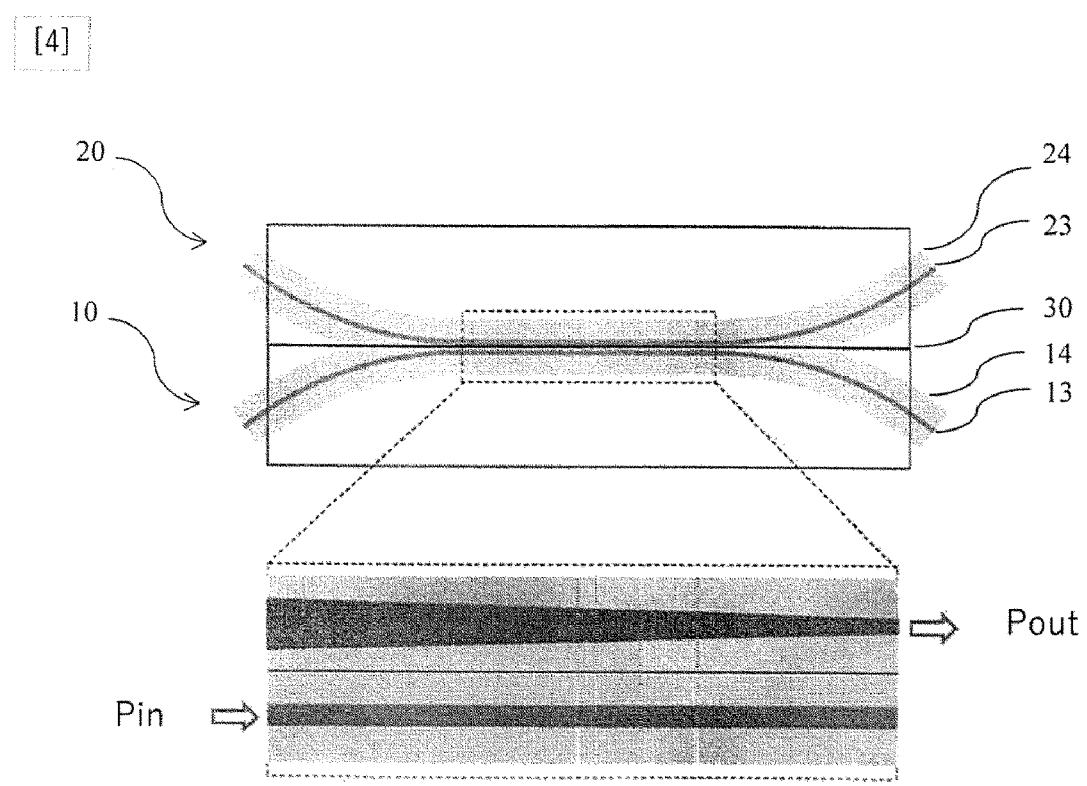
FIG. 4 illustrates a configuration of an optical multiplexing and demultiplexing circuit.

The configuration of an optical multiplexing and demultiplexing circuit of the present disclosure will be described with reference to FIG. 4. In FIG. 4, reference sign 10 denotes a currently used coated optical fiber, reference sign 13 denotes a core of the currently used coated optical fiber, reference sign 14 denotes a cladding region of the currently used coated optical fiber, reference sign 20 denotes an optical waveguide for branching, reference sign 23 denotes a core of the optical waveguide for branching, reference sign 24 denotes a cladding region of the optical waveguide for branching, and reference sign 30 denotes a polished surface. The optical waveguide for branching 20 may be a coated optical fiber or a planar optical waveguide. The core diameter of the optical waveguide for branching 20 is linearly decreased in the longitudinal direction in a coupling section with the currently used coated optical fiber 10.

An optical multiplexing and demultiplexing method and a manufacturing method for the optical multiplexing and demultiplexing circuit will be described with reference to FIG. 4. In FIG. 4, a polished surface of the coated optical fiber 10 whose side surface is polished to the core 13 or a vicinity of the core 13, and a polished surface of the optical waveguide for branching 20 whose core diameter is linearly decreased in the longitudinal direction and whose side surface is polished to the core 23 or a vicinity of the core 23 are arranged face to face. Then, the polished surface of the currently used coated optical fiber 10 and the polished surface of the optical waveguide for branching 20 are moved relative to each other to align the polished surfaces so that the desired branching ratio is obtained from one end of the currently used coated optical fiber 10 to the end, distal to the former end, of the optical waveguide for branching 20. To manufacture the optical multiplexing and demultiplexing circuit, the polished surfaces each other are further fixed after the alignment. For the fixing, the surfaces may be fixed with an adhesive that also serves as a refractive index matching material, or a refractive index matching material may be applied to mechanically fix the surfaces with a clip.

Figure 5:
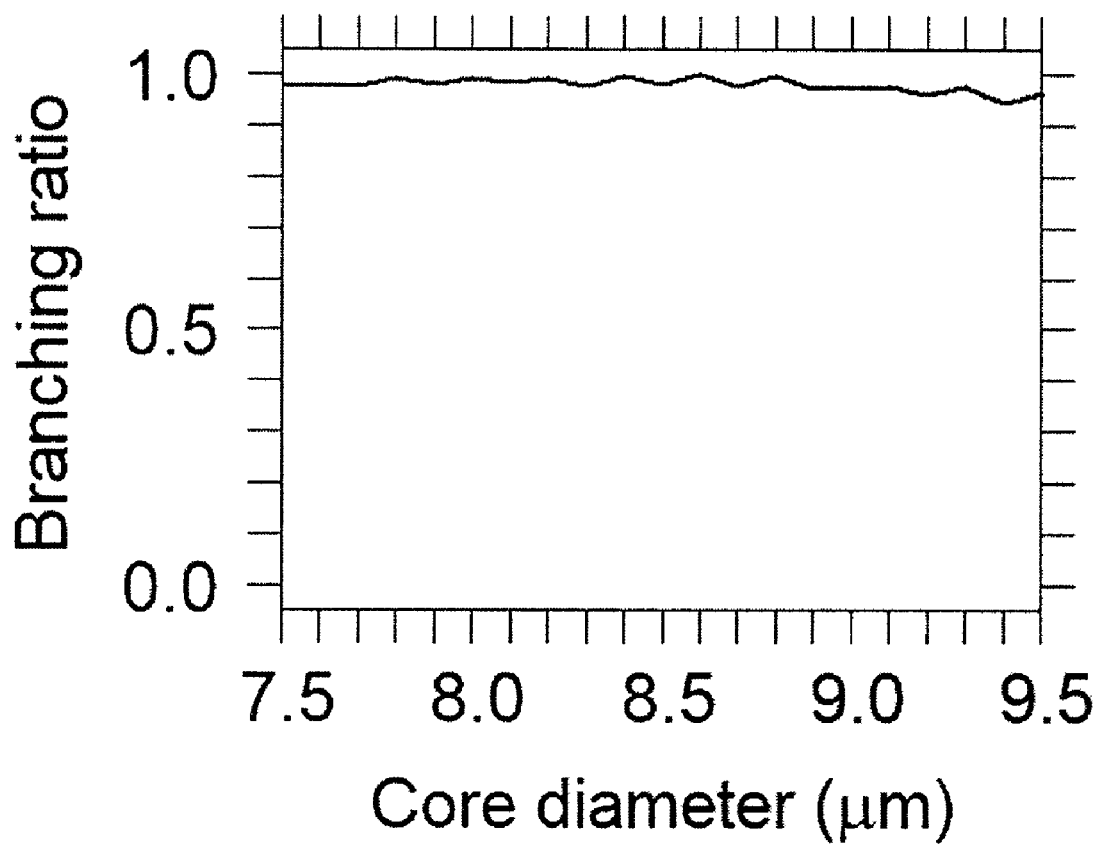
FIG. 5 depicts characteristics of an optical multiplexing and demultiplexing circuit.
Figure 6:
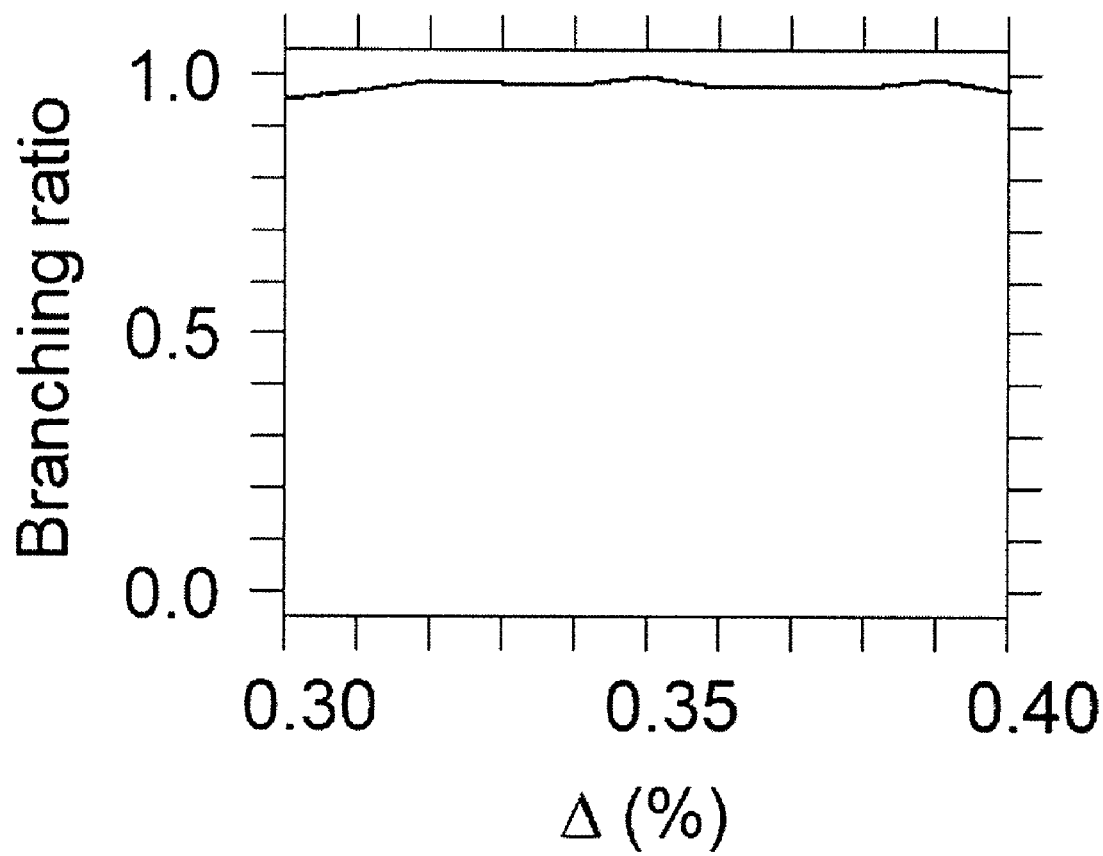
FIG. 6 depicts characteristics of an optical multiplexing and demultiplexing circuit.

FIG. 5 depicts branching ratio to variation in the core diameter of the currently used coated optical fiber 10 under a condition where the core diameter of the optical waveguide for branching 20 is linearly decreased by a taper ratio of 0.0001 from 6.25 µm to 12.25 µm so that the propagation constant varies in the longitudinal direction, and FIG. 6 depicts branching ratio to variation in refractive index contrast Δ of the currently used coated optical fiber 10 under the same condition. The branching ratio refers to ratio of Pout/Pin in FIG. 4.

In FIG. 5, regardless of the core diameter of the currently used coated optical fiber 10, constant branching ratio is obtained in a wide core diameter range of the currently used coated optical fiber 10. Similarly in FIG. 6, regardless of the refractive index contrast of the currently used coated optical fiber 10, constant branching ratio is obtained.

In the present disclosure, the cross section of the optical waveguide for branching is circular, but a shape other than a circular shape, for example, a rectangular shape may bring the same effect. The core diameter of the optical waveguide for branching is decreased in the longitudinal direction, but the same effect may be obtained even when the core diameter is increased. Although the core diameter of the optical waveguide for branching varies linearly, the core diameter may vary non-linearly, for example, may vary based on a quadratic function, a triangle relationship, or an exponential function. It is desirable for the core diameter of the optical waveguide for branching to be monotonically decreased or monotonically increased with the core diameter partially unvarying.

According to the optical multiplexing and demultiplexing method, the optical multiplexing and demultiplexing circuit, and the manufacturing method for the optical multiplexing and demultiplexing circuit of the present disclosure, the use of the optical waveguide for branching whose core diameter varies in the longitudinal direction makes it possible to multiplex and demultiplex the light with one type of optical waveguide for branching or a small number of types of optical waveguides for branching for the currently used coated optical fibers having a diversity of propagation constants while minimizing influence on the currently used coated optical fibers.

Figure 7:
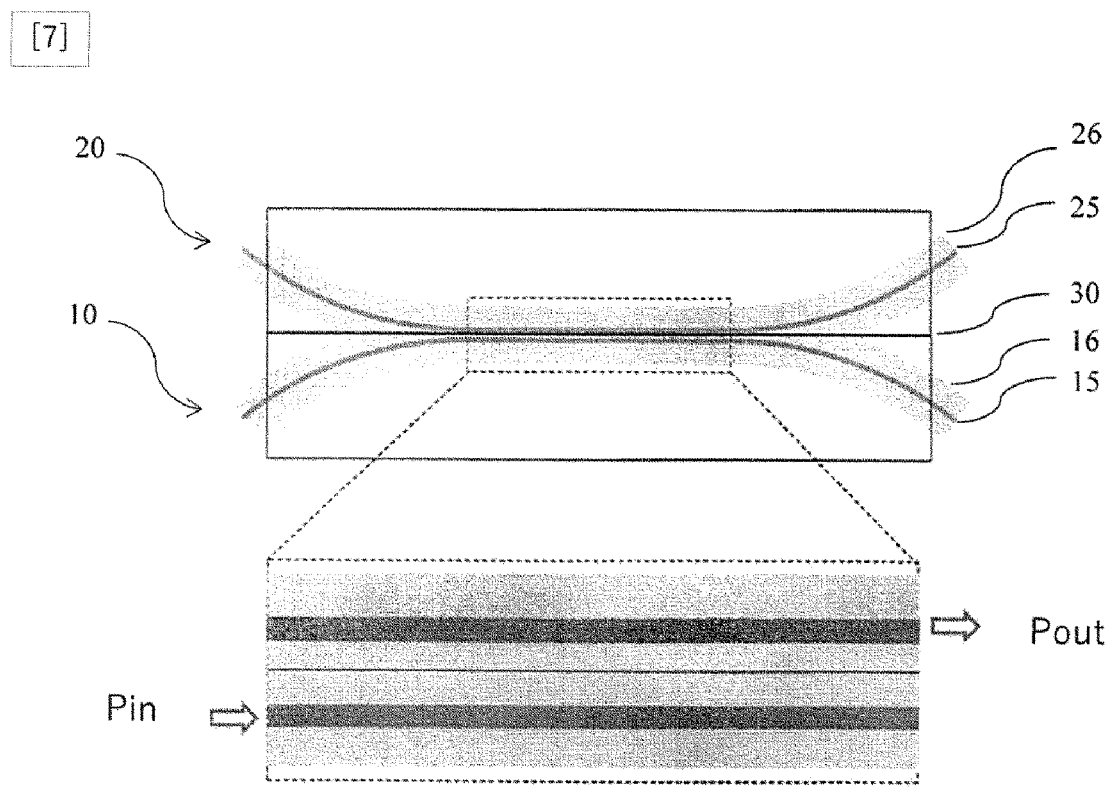
FIG. 7 illustrates a configuration of an optical multiplexing and demultiplexing circuit.

The configuration of an optical multiplexing and demultiplexing circuit of the present disclosure will be described with reference to FIG. 7. In FIG. 7, reference sign 10 denotes a currently used coated optical fiber, reference sign 15 denotes a core of the currently used coated optical fiber, reference sign 16 denotes a cladding region of the currently used coated optical fiber, reference sign 20 denotes an optical waveguide for branching, reference sign 25 denotes a core of the optical waveguide for branching, reference sign 26 denotes a cladding region of the optical waveguide for branching, and reference sign 30 denotes a polished surface. The optical waveguide for branching 20 may be a coated optical fiber or a planar optical waveguide. The refractive index of the optical waveguide for branching 20 is linearly increased in the longitudinal direction in a coupling section with the currently used coated optical fiber 10.

An optical multiplexing and demultiplexing method and a manufacturing method for the optical multiplexing and demultiplexing circuit will be described with reference to FIG. 7. In FIG. 7, a polished surface of the coated optical fiber core 10 whose side surface is polished to the core 15 or a vicinity of the core 15, and a polished surface of the optical waveguide for branching 20 whose refractive index is linearly increased in the longitudinal direction and whose side surface is polished to the core 25 or a vicinity of the core 25 are arranged face to face. Then, the polished surface of the currently used coated optical fiber 10 and the polished surface of the optical waveguide for branching 20 are moved relative to each other to align the polished surfaces so that desired branching ratio is obtained from one end of the currently used coated optical fiber 10 to the end, distal to the former end, of the optical waveguide for branching 20. To manufacture the optical multiplexing and demultiplexing circuit, the polished surfaces each other are further fixed after the alignment. For the fixing, the surfaces may be fixed with an adhesive that also serves as a refractive index matching material, or a refractive index matching material may be applied to mechanically fix the surfaces with a clip.

Figure 8:
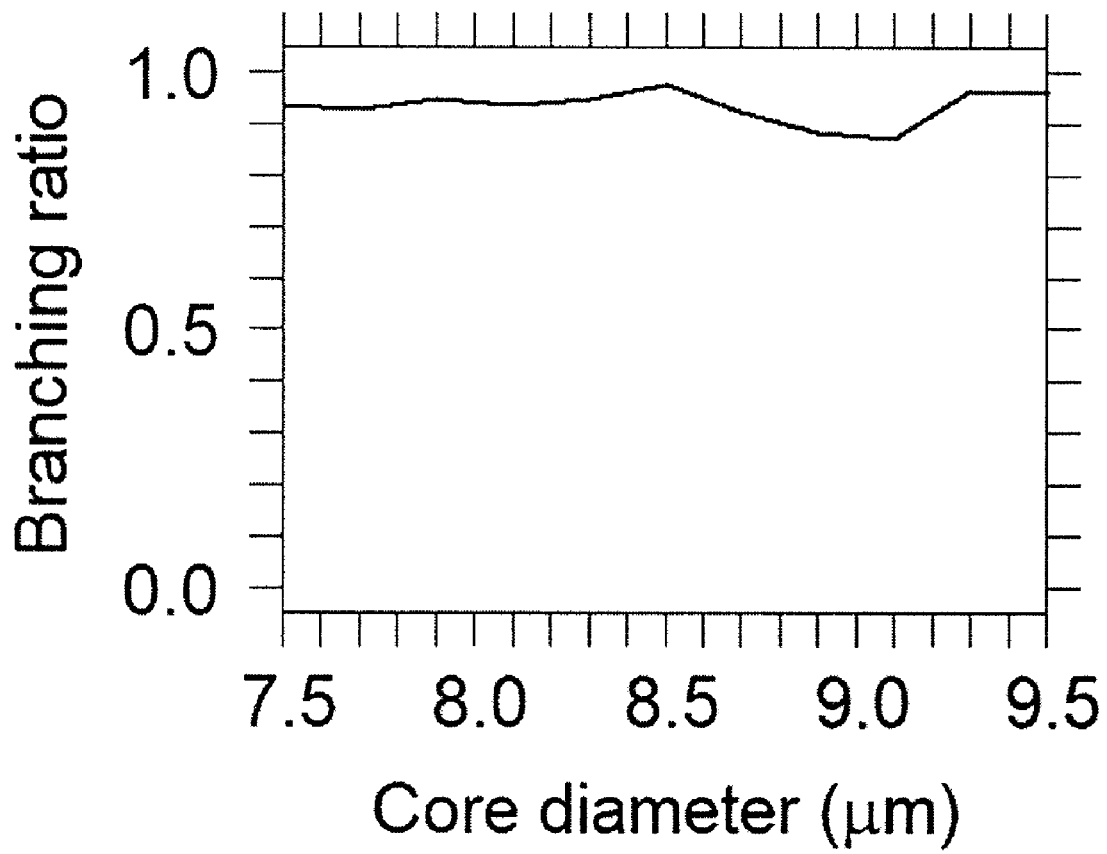
FIG. 8 depicts characteristics of an optical multiplexing and demultiplexing circuit.
Figure 9:
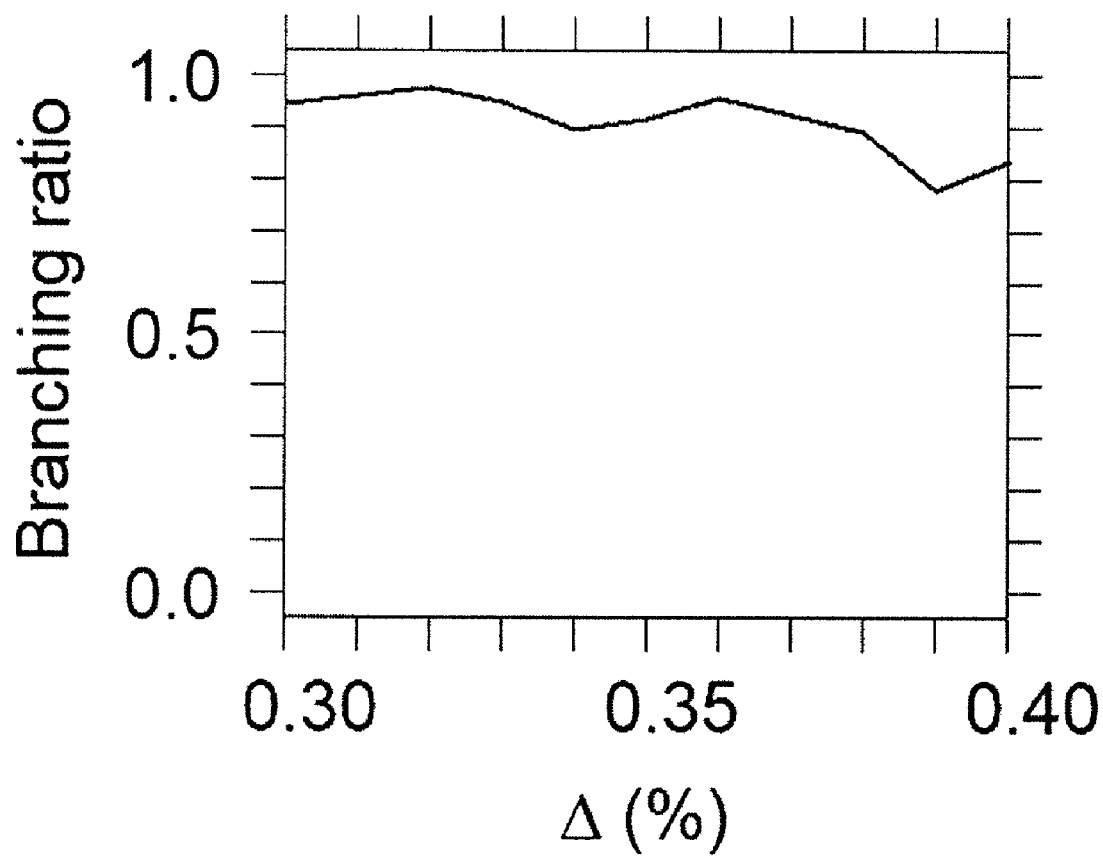
FIG. 9 depicts characteristics of an optical multiplexing and demultiplexing circuit.

FIG. 8 depicts branching ratio to variation in the core diameter of the currently used coated optical fiber 10 under a condition where the refractive index of the optical waveguide for branching 20 is linearly increased by 0.04% per centimeter from 0.25% to 0.45% so that the propagation constant varies in the longitudinal direction, and FIG. 9 depicts branching ratio to variation in refractive index contrast Δ of the currently used coated optical fiber 10 under the same condition. The branching ratio refers to ratio of Pout/Pin in FIG. 7.

In FIG. 8, regardless of the core diameter of the currently used coated optical fiber 10, constant branching ratio is obtained in a wide core diameter range of the currently used coated optical fiber 10. Similarly in FIG. 9, regardless of the refractive index contrast of the currently used coated optical fiber 10, constant branching ratio is obtained.

In the present disclosure, the cross section of the optical waveguide for branching is circular, but a shape other than a circular shape, for example, a rectangular shape may bring the same effect. The refractive index of the optical waveguide for branching is increased in the longitudinal direction, but the same effect may be obtained even when the refractive index is decreased. Although the refractive index of the optical waveguide for branching varies linearly, the refractive index may vary non-linearly, for example, may vary based on a quadratic function, a triangle relationship, or an exponential function. It is desirable for the refractive index of the optical waveguide for branching to be monotonically decreased or monotonically increased with the refractive index partially unvarying.

According to the optical multiplexing and demultiplexing method, the optical multiplexing and demultiplexing circuit, and the manufacturing method for the optical multiplexing and demultiplexing circuit of the present disclosure, the use of the optical waveguide for branching whose refractive index varies in the longitudinal direction makes it possible to multiplex and demultiplex the light with one type of optical waveguide for branching or a small number of types of optical waveguides for branching for the currently used coated optical fibers having a diversity of propagation constants while minimizing influence on the currently used coated optical fibers.

In the present disclosure, only the refractive index of the core of the optical waveguide for branching is varied, but only the refractive index of the cladding region of the optical waveguide for branching may be varied, or the refractive indices of both the core and cladding region of the optical waveguide for branching may be varied.

In the disclosure described thus far, a case has been exemplified in which the variation in the propagation constant is caused by the variation in the core diameter or the refractive index contrast of the currently used coated optical fiber, but the optical waveguide for branching of the present disclosure is applicable in a case where the variation in the propagation constant occurs regardless of the variation in the core diameter or the refractive index contrast. Further, an example in which the core diameter of the optical waveguide for branching varies in the longitudinal direction and an example in which the refractive index of at least one of the core or the cladding region thereon varies in the longitudinal direction have been given, but both of them may vary in the longitudinal direction. Furthermore, also as an optical waveguide for branching in which the propagation constant varies in the longitudinal direction with other parameters than those described above, a similar effect may be obtained.

INDUSTRIAL APPLICABILITY

The present disclosure can be applied in the information communication industry.

REFERENCE SIGNS LIST

10: Currently used coated optical fiber
11, 13, 15: Core of currently used coated optical fiber
12, 14, 16: Cladding region of currently used coated optical fiber
20: Optical waveguide for branching
21, 23, 25: Core of optical waveguide for branching
22, 24, 26: Cladding region of optical waveguide for branching
30: Polished surface

The invention claimed is:

1. An optical multiplexing and demultiplexing method, comprising:
   arranging, face to face, a polished surface of a coated optical fiber whose side surface is polished to a core or a vicinity of the core and a polished surface of an optical waveguide that has a junction part in which a refractive index of at least one of a core or a cladding region varies in a longitudinal direction and whose side surface is polished to the core or a vicinity of the core; and
   aligning the polished surface of the coated optical fiber and the polished surface of the optical waveguide at a position where the polished surface of the coated optical fiber and the junction part are coupled so as to form a coupling section in which a desired branching ratio is obtained from one end of the coated optical fiber to the end, distal to the former end, of the optical waveguide by relatively moving the polished surface of the coated optical fiber and the polished surface of the optical waveguide in the longitudinal direction of the junction part.

2. An optical multiplexing and demultiplexing circuit, wherein a polished surface of a coated optical fiber whose side surface is polished to a core or a vicinity of the core and a polished surface of an optical waveguide that has a junction part in which a refractive index of at least one of a core or a cladding region varies in a longitudinal direction and whose side surface is polished to the core or a vicinity of the core are aligned at a position where the polished surface of the coated optical fiber and the junction part are coupled so as to form a coupling section in which a desired branching ratio is obtained from one end of the coated optical fiber to the end, distal to the former end, of the optical waveguide by relatively moving the polished surface of the coated optical fiber and the polished surface of the optical waveguide in the longitudinal direction of the junction part.

3. A manufacturing method for an optical multiplexing and demultiplexing circuit, the method comprising:

arranging, face to face, a polished surface of a coated optical fiber whose side surface is polished to a core or a vicinity of the core and a polished surface of an optical waveguide that has a junction part in which a refractive index of at least one of a core or a cladding region varies in a longitudinal direction and whose side surface is polished to the core or a vicinity of the core; and fixing the polished surface of the coated optical fiber and the polished surface of the optical waveguide at a position where the polished surface of the coated optical fiber and the junction part are coupled so as to form a coupling section in which a desired branching ratio is obtained from one end of the coated optical fiber to the end, distal to the former end, of the optical waveguide by relatively moving the polished surface of the coated optical fiber and the polished surface of the optical waveguide in the longitudinal direction of the junction part.

\* \* \* \* \*